This specification is the property of the Patent Office.
8041X
Foster & Van Vleck.
Constructing Cisterns.
Patented Mar. 3, 1834.
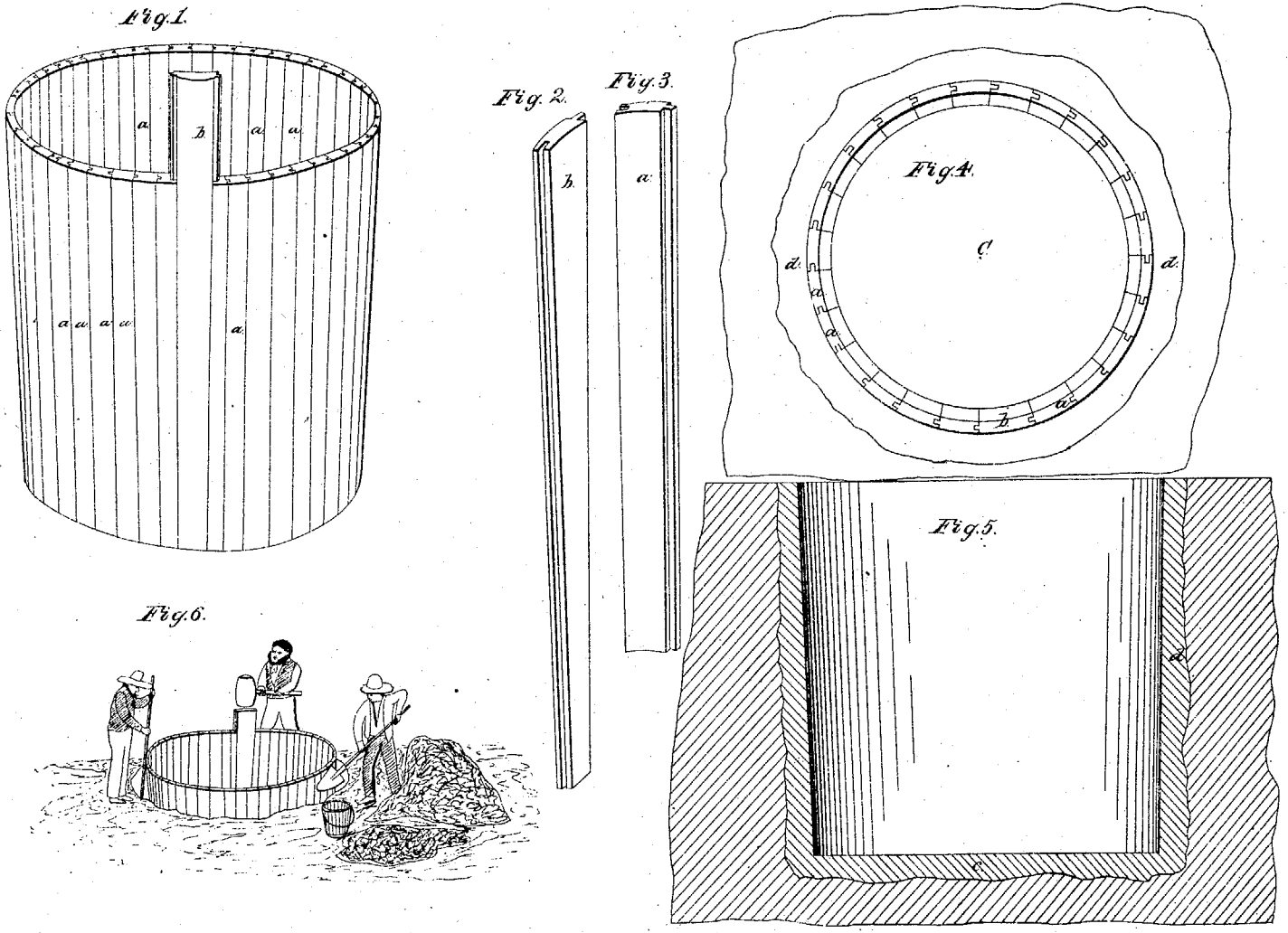

Nathaniel Foster & William Van Vleck

Letters Patent

The Schedule referred to in these Letters Patent and making part of the same Containing a description in the words of the said Nathaniel Foster and William Van Vleck themselves of their improvement in constructing cisterns reservoirs and walls for holding water, or any other liquid and for other purposes.

To all to whom these presents shall come Be it known that Nathan-iel Foster and William Van Vleck of Sullivan in the county of Madison and State of New York have invented a new and useful improvement in constructing cisterns reservoirs and walls for holding water or any other liquid and for other purposes and that the following is a full and exact description of the construction of a cistern reservoir & wall in which the said improvement appears.

1 The curved cistern or reservoir for holding water or any other liquid. a set of staves made longer or shorter according to the depth of the intended cistern or reservoir and so constructed that when they are set up in a circular form by joining their edges they constitute a pattern curve, [illegible] which is the form of a tube to construct the cistern or reservoir as hereinafter described these staves are [illegible] [illegible] as [illegible] required and as the diameter of the cistern is intended and of equal or unequal width at either end except the last stave to be set up called the key stave which is wider at the top than at the bottom for the purpose of drawing it from the pattern curve when the wall is constructed as mentioned hereafter. These staves forming the pattern curve are matched grooved or [illegible] so as to retain them in their places while constructing the wall, or they are secured in their places by [illegible] hoops or [illegible] or wedges or other [illegible] them, After the pattern curve is thus prepared [illegible] the pit for the cistern or reservoir is dug of sufficient diameter to construct it of the size intended and any depth required. A mortar or cement is formed for the bottom of the cistern or reservoir of Hydraulic

2492

Cement or water lime and sand and gravel or stone or brick or
any hard substance and a coat of the mortar or cement thus prep-
ared laid upon the bottom of the pit of sufficient thickness to insure
permanency and the pattern core is then set up upon the same
in the manner above described —

The cistern reservoir or wall is then constructed
around the said core on the outside by uniting hydraulic cement
or water lime with sand and gravel or stone or brick or any hard substan-
ce in any proportions to make mortar cement grout or puddle. The mortar
cement grout or puddle to be of any consistency and the wall thus con-
structed to be of any thickness. The pattern core when the wall is fin-
ished to remain until the cement used in constructing the cistern, res-
ervoir or wall is sufficiently indurated: when the key stave is loosened
and the whole pattern core removed. The cistern is then covered and com-
-pleted in any ordinary way. —

2d An angular cistern reservoir or wall is formed by like materials and
process for holding water or any other liquid or for any other use.

What is claimed as the improvement invented by the subscribers
in the above specification is first the pattern core around which to con-
-struct the cistern reservoir or wall and secondly compounding the
hydraulic cement with substances of any kind and thus forming
a permanent wall by means of the pattern core

Witnesses
[illegible]
Moses Williams

Nathaniel [illegible]
William [illegible]

Ex.
Ch. [illegible]

Drawing